May 17, 1966         J. S. LATAWIEC         3,251,451
METHOD OF ORIENTING A ROTARY CLOSURE
Original Filed Sept. 24, 1963         2 Sheets-Sheet 1
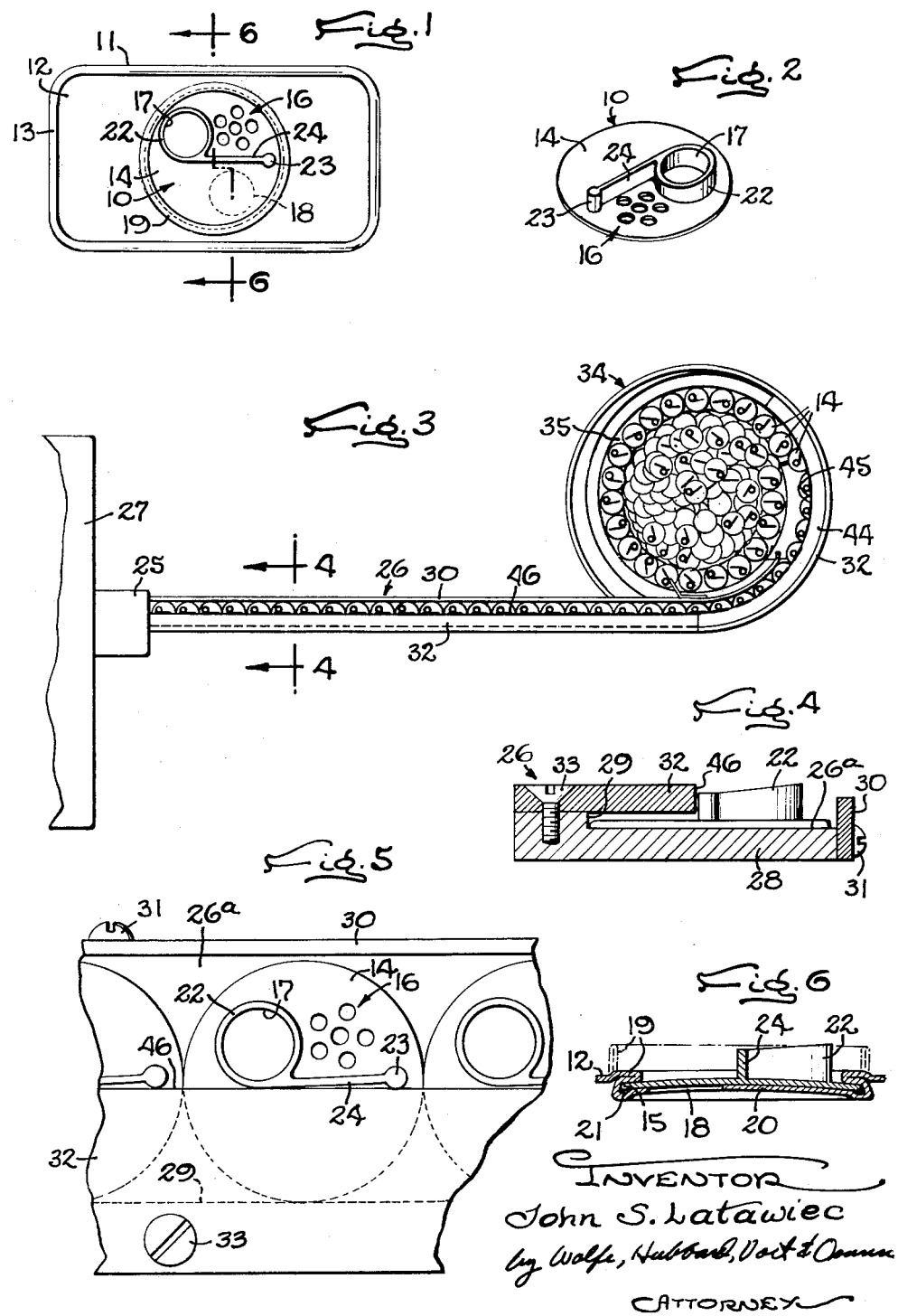
INVENTOR
John S. Latawiec
by Wolfe, Hubbard, Voit & Osann
ATTORNEY May 17, 1966 J. S. LATAWIEC 3,251,451
METHOD OF ORIENTING A ROTARY CLOSURE
Original Filed Sept. 24, 1963 2 Sheets-Sheet 2
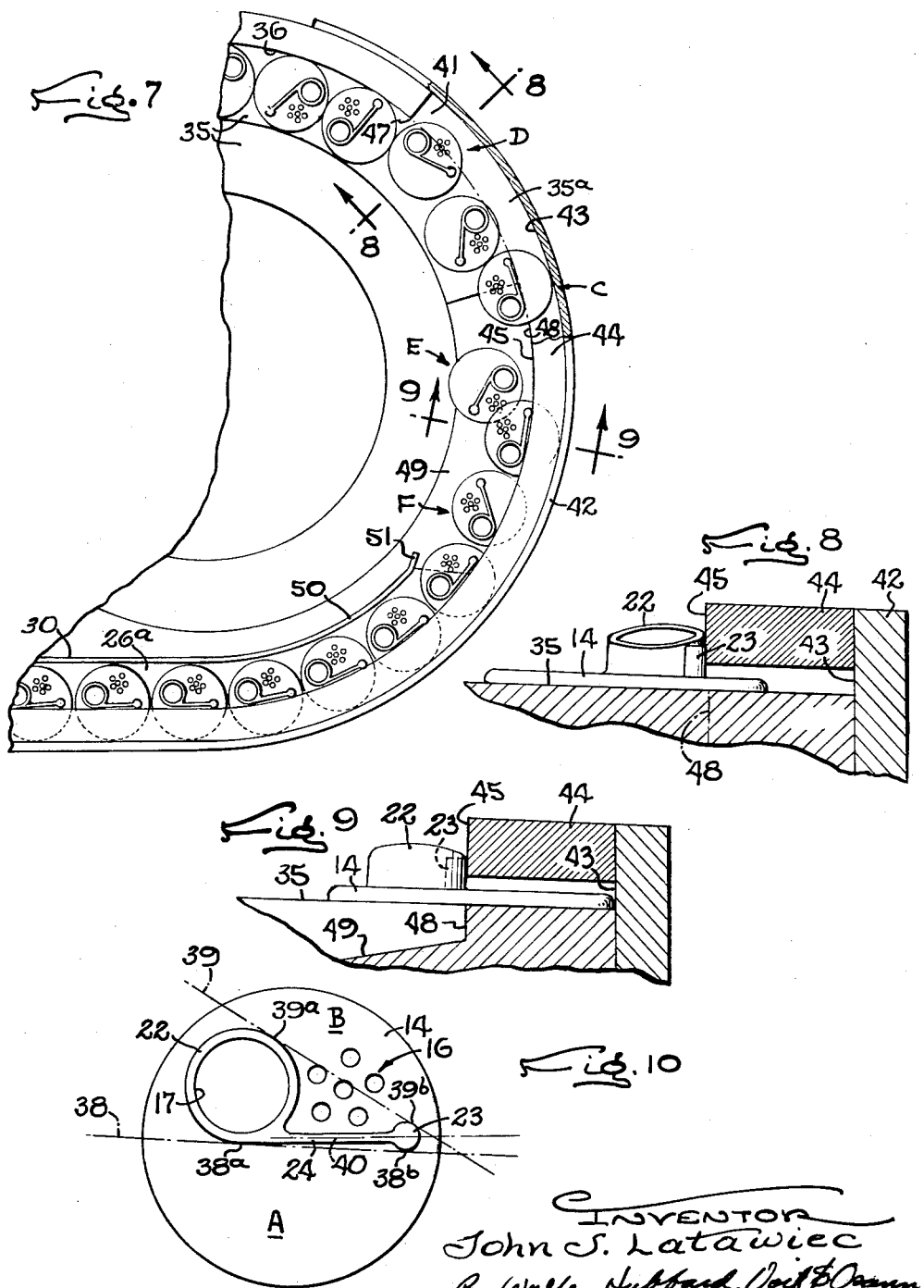
INVENTOR
John S. Latawiec
By Wolfe, Hubbard, Voit & Osann
ATTORNEY

United States Patent Office 3,251,451
Patented May 17, 1966

3,251,451
METHOD OF ORIENTING A ROTARY CLOSURE
John S. Latawiec, Lancaster, Pa., assignor to J. L. Clark Manufacturing Co., Rockford, Ill., a corporation of Illinois
Original application Sept. 24, 1963, Ser. No. 311,159. Divided and this application May 5, 1965, Ser. No. 453,358
7 Claims. (Cl. 198—33)

This application is a division of my copending application Serial No. 311,159, filed September 24, 1963, now abandoned, and relates to the method of orienting a rotary disk used as a closure for a dispensing container such as that shown in Patent No. 3,129,860 in which the disk is journaled on a top wall of the container having a dispensing opening therethrough which registers with a pouring hole in the disk in one angular position of the latter. Turning of the disk opening into and out of this dispensing position is effected manually by grasping projections upstanding from the top of the disk to form a hand grip. The assembly and coupling of such disks to the container tops is accomplished in automatic machinery by which the disks and tops are picked up, arranged in a row, and delivered to an assembly station, one disk being coupled to each top. Prior to packing of filled containers for shipment, the disks are turned to positions in which the dispensing openings in the top are covered and closed by the disks, thereby preventing leakage of the contents during shipping and handling.

The general object of the present invention is to utilize the projections on top of the disk in a novel manner in automatic orientation of the disks to facilitate the assembly of disks on container tops in positions always closing the dispensing openings therein.

A more detailed object is to use the projections on the disks first to bring each disk generally into one of two angular positions during the advance of a row of disks in edge-to-edge relation, and then to distinguish the disks in the desired angular position from those in the other whereby the disoriented disks may be ejected from the row.

Another object is to utilize the projections in the ejection of disoriented disks as well as in the initial orientation of and distinguishing between the disks in the row.

Other objects and advantages of the invention will become apparent from the following detailed descriptions taken in connection with the accompanying drawings, in which FIGURE 1 is a plan view of a container provided with a closure disk adapted to be oriented in accordance with the present invention.

FIG. 2 is a perspective view of the disk.

FIG. 3 is a fragmentary plan view on a reduced scale of a machine for delivering the disks to the assembly station.

FIG. 4 is an enlarged fragmentary sectional view taken along the line 4—4 of FIG. 3.

FIG. 5 is an enlarged fragmentary view of a portion of FIG. 3.

FIG. 6 is an enlarged fragmentary sectional view taken along the line 6—6 of FIG. 1.

FIG. 7 is an enlarged fragmentary view of another portion of FIG. 3.

FIG. 8 is an enlarged fragmentary sectional view taken along the line 8—8 of FIG. 7.

FIG. 9 is an enlarged fragmentary sectional view taken along the line 9—9 of FIG. 7.

FIG. 10 is an enlarged plan view of the cap shown in FIG. 2.

Shown in the drawings for purposes of illustration is a rotary closure 10 for a dispensing container 11 of generally rectangular cross-section having a top wall 12 joined to the container by a standard seam 13. The closure is in the form of a circular disk 14 disposed in and seated against the bottom of a cup-like depression 15 in the top wall and journaled in the cup for manual turning to different angular positions to bring holes 16 and 17 in the disk selectively into and out of register with a dispensing opening 18 (FIGS. 1 and 6) in the bottom of the cup.

As shown in FIGS. 1 and 6, the top wall 12 is a flat metal sheet with the cup formed at its center and surrounded by an annular rib 19 initially projecting upwardly from the cylindrical sidewall of the cup as shown in broken lines in FIG. 6. The bottom of the cup is dished or curved upwardly to form a rounded dome 20 (FIG. 6) of pronounced convex curvature and is surrounded by a shallow groove 21 separating the dome from the sidewall. A circular hole is punched through the dome near the peripheral edge thereof to form the dispensing opening 18.

The disk 14 is flat and relatively thin and preferably is composed of resiliently flexible material such as high density polyethylene, each being larger in diameter than the diameter of the dome 20 but smaller than the diameter of the cup wall 15. The disk is inserted in the cup and positioned against the dome with the peripheral portion of the disk overhanging the groove 21. With the disk in this position, the rib 19 is bent inwardly against the top of the disk to exert downward pressure on the overhanging portion and bend the disk into firm face-to-face sealing engagement with the dome.

To provide for selective sifting or pouring of powdered material from the container, a group of sifter holes 16 is formed near the periphery of the disk 14 in radial alinement with the dispensing opening 18 in the dome 20, and the pouring hole 17 is approximately the same size as the dispensing opening and is formed in the disk in radial alinement with the sifter holes but, angularly spaced from the latter. A tubular spout 22 molded integrally with the disk and surrounding the pouring hole projects upwardly from the top of the disk. In one angular position of the disk relative to the container top 12, the sifter holes 16 register with the dispensing opening, and in another position, the pouring hole and spout register with the opening. In all other positions, the dispensing hole is covered and effectively sealed by the imperforate portion of the disk.

In this instance, the pouring spout 22 is utilized as part of the hand grip for turning the disk 14 relative to the container 11 between sifting, pouring and closed positions. The remainder of the grip comprises a narrow rib 24 upstanding from the top of the disk and preferably joined at one end to the spout as shown in FIGS. 1 through 10. A cylindrical pin 23 of approximately the same height as the spout is molded integrally with the other end of the rib and disposed adjacent the edge of the disk generally opposite the spout. With this arrangement, the hand grip may be grasped between the thumb and forefinger of the user, usually at the spout and the pin 23, to turn the disk to the sifting or pouring positions or to an intervening position in which the dispensing opening 18 is closed.

During assembly of the closures 10 on the container tops 12 with automatic high production machinery, container tops are conveyed one by one through an assembly station beneath an escapement 25 (FIG. 3) at the end of a track 26 along which the disks are moved in edge-to-edge relation into the escapement for positioning on the top passing the escapement. Beyond the escapement, the tops and the disks move into an assembly machine 27 for rolling the ribs 19 over the peripheries of the disks to journal the latter on the tops. Herein, the left portion of the track is formed by the flat upper surface 26ᵃ of an elongated horizontal bar 28 (see FIG. 4), the surface 26ᵃ being slightly wider than the diameter of the disks.

Preferably, the disks are fed onto and along the track 26 by a vibrating hopper 34 (FIGS. 3 and 7) formed with an upwardly facing ledge 35 extending helically upwardly from the bottom of the hopper around the inside wall thereof and merging at its upper end with the track surface 26ª to form a continuation of the track at the right end of the bar 28. In a manner well known to those skilled in the art, the drum is vibrated to advance disks from a supply in the bottom of the drum onto the ledge 35 and then step by step upwardly along the ledge in random angular positions and onto the bar 28. One vibrating hopper suitable for this purpose is the type in which the vibratory motion of the drum first kicks the disks upwardly and a short distance clockwise (FIGS. 3 and 7) about the hopper axis, and then moves the drum reversely while the disks are in the air thereby producing a step-by-step forward motion of the disks. The ledge 35 is of approximately the same width as the disk diameter and is inclined downwardly and radially outwardly so that the disks hug the helical sidewall 36 of the hopper and advance single file along the ledge and onto the bar 28, the latter also being vibrated to advance the row of disks along the bar and through the escapement 25 which is shown only schematically herein.

The projections upstanding from the top of each disk 14 are arranged to divide the top of the disk and define unobstructed areas A and B of substantially different sizes on opposite sides of the projections which may be distinguished from each other automatically in accordance with the present invention during the feeding of the closure 10 toward the tops 12, the projections being utilized to turn the disks to a predetermined angular position if the disks are disposed within a certain range of angular positions and to remove the remainder of the disks from the row by ejecting them from the track 26.

For this purpose, the upstanding projections on top of the disk 14 are arranged on the disk to provide laterally facing abutments lying along and defining two intersecting lines 38 and 39 extending along chords of the disk defining the two segments A and B of substantially different maximum widths, the projections lying within the acute included angle of the lines with the abutments facing outwardly toward the periphery of the disk. While different arrangements of the top projections may be employed to define the lines 38 and 39 and the segments A and B, the larger of the segments is bounded in the present instance by points 38ª and 38ᵇ on one side of the spout 22 and the pin 23 on the opposite end of the rib 24, and the smaller segment is defined by points 39ª and 39ᵇ on the opposite sides of the spout and the pin.

Herein, the pin 23 and the rib 24 are formed on a diameter 40 (FIG. 10) of the disk 14 that is tangent to one side of the pouring spout approximately at the point 38ª. The sifter holes 16 preferably are formed on the same side of this diameter as the spout and are closely adjacent the spout, and the entire segment A is imperforate and disposed well below the level of the tops of the projections on the disk 14.

In accordance with the present invention, the relative positions of the segments A and B of each disk 14 moving along the track 35, 26 toward the escapement 25 are sensed by moving one segment of the disk under a member overlying the outer side of the track, bringing the abutments 38ª, 38ᵇ or 39ª, 39ᵇ defining that segment into engagement with a guide surface formed by an edge of the member, and sensing the distance the disk 14 extends beyond the guide edge in this condition of the disk. Since the two segments are of substantially different widths, the disk extends substantially different differences beyond the guide edge when different pairs of abutments are in engagement with the edge thereby providing a basis for readily distinguishing between the disks in the two different angular positions along the guide member. In effect, the guide edge feels of the projections on each disk and thus senses the angular position of the disk.

As shown in FIGS. 7 and 8, the upper end section 35ª of the ledge 35 is wider than and offset radially outwardly from the remainder of the ledge to form a lateral step 41 in the track at the end of the sidewall of the hopper, this step also being inclined downwardly and radially outwardly as shown in FIG. 8. A bar 42 curved around the exterior of the hopper forms an offset extension 43 of the sidewall 36 and supports a cover bar 44 which overhangs the track above the level of the disks 14 but below the level of the upper ends of the spouts 22, the ribs 24 and the pins 23. The inner edge 45 of this bar is spaced from the offset sidewall 43 a distance slightly greater than the maximum width of the wider segments A, and follows the curvature of the sidewall around the upper end of the cover bar.

As each disk passes the shoulder 47 formed by the offset in the sidewall 36, 43, the drum vibration and the incline of the lateral step 41 cooperate to shift the disk radially outwardly and partially under the guide bar 44. If, during this movement, only one of a pair of abutment surfaces engages the edge 45, the disk pivots on the edge until both abutments of the pair engage the edge and the associated line 38 or 39 lies beneath the edge.

It will be seen that there are two angular positions that the disks will assume along the bar 44. If the spout 22 is ahead of the pin 23 as the disk passes the shoulder 47, the projections on the disk will settle against the guide edge 45 as indicated generally at C in FIG. 7 with the line 38 beneath the edge and the wider segment A beneath the bar. This is the proper angular position for assembly of the disks in the closed positions. If, on the other hand, the pin 23 is ahead of the spout as the disk passes the shoulder, the projections settle against the guide edge in the manner shown at D in FIG. 7 with the smaller segment B under the guide bar 44 and the line 39 beneath the edge 45. Due to the difference in sizes of the segments, disks in the disoriented positions shown at D are offset inwardly from those in the oriented position shown at C. Thus, it will be seen that each disk 14 is turned into one of two angular positions during the feeding of the disk along the track 26 and the angular position of the disk then is sensed to distinguish between those that are properly oriented for assembly in the closed position and those that are disoriented.

To eject the disoriented disks 14 from the track 35, 26, the width of the ledge is reduced beyond the shoulder 47 to an amount less than the diameter of the disks. The width of the ledge is such that oriented disks remain on the track but disoriented disks, which overhang the inner side 48 of the ledge by a greater amount, and any disks that may not have slid under the guide plate 44, fall off the track and slide down an incline 49 (FIGS. 7 and 9) into the hopper as shown at E. A curved pick-off finger 50 is positioned along the inside of the surface 26ª with its free end 51 inclined away from the track to wipe off any improperly positioned disks remaining on the track and to cam the remaining disks, such as that shown at F, outwardly to move the abutments 38ª, 38ᵇ close to the edge 45.

The left end (FIG. 3) of the pick-off finger 50 merges smoothly with a side rail 30 fastened by screws 31 to the bar 28, and a straight cover bar 32 is fastened to the top of the bar 28 by screws 33 in the manner shown in FIG. 4 to project beyond a shoulder 29 on the bar and overhang the track. The shoulder 29 forms a continuation of the sidewall 43 and the bar 32 and its edge 46 form continuations of the bar 44 and the guide edge 45. Thus, the disks are guided along the track 26 and are positively held in the oriented positions all the way to the escapement 25 with the pouring spout 22 and the sifter holes 16 on the left-hand half of the disk 14 as viewed in FIG. 9. Each container top is conveyed past the escapement with the cup beneath the path of the disks and with the dispensing opening 18 beneath the right-hand imperforate half of the disk. Accordingly, the disks are assembled as shown in FIG. 1 in the closed position.

From the foregoing, it will be apparent that the novel method of orienting the disks 14 makes it possible to assemble the disks on the container tops 12 automatically in tightly closed positions with relative simple machinery and at high production rates. The disks first are arranged generally in one of two angular positions by engagement of the projections with a guide surface, the angular positions of the disks are sensed, and the disoriented disks are ejected from the track.

I claim as my invention:

1. The method of orienting disks having projections upstanding from one side thereof forming oppositely facing sets of abutments lying along two lines on chords of the disks defining segments of substantially different sizes, said method comprising the steps of, advancing a row of such disks along a track in random angular positions, shifting one edge portion of each disk under a member having a guide surface extending along said track and bringing one set of abutments on each disk close to said guide surface thereby arranging said disks generally in two angular positions, sensing the amount by which each disk projects beyond said member and thereby sensing the angular position of each disk, and removing from said row all disks that are arranged with the smaller of said segments under said member.

2. The method of orienting disks having projections upstanding from one side thereof forming oppositely facing sets of abutments lying along two lines on chords of the disks defining segments of substantially different sizes, said method comprising the steps of, advancing a row of such disks along a track in random angular positions, engaging one set of abutments with a guide member along said track thereby to turn each disk generally into one of two angular positions, sensing which of said disks are in a predetermined angular position, and removing the remainder of the disks from said row.

3. The method of orienting disks having projections upstanding from one side thereof forming oppositely facing sets of abutments lying along two lines on chords of the disks defining segments of substantially different sizes, said method comprising the steps of, advancing a row of such disks along an upwardly facing surface in random angular positions, urging each disk edgewise and partially under a guide overlying and extending along said track to bring one set of said abutments on each disk against said guide thereby turning some of said disks into a first angular position and some of the disks into a second angular position depending upon which set of abutments engages said guides, continuing the advance of the disks along said surface and said guide with said abutments engaging the guide and one segment of each disk under the guide, and, at a preselected point in the advance of said disks, shifting edgewise and off said surface those disks which are disposed in said first angular position and leaving on said track only those disks which are in said second position.

4. The method defined in claim 3 in which the disks in said first angular position are those arranged with the smaller of said segments under said guide, and such disks overhang and fall off a ledge formed along one side of the surface at said preselected point.

5. The method of delivering circular disks to a point of use with the disks disposed edge to edge and each in the same angular position, each of said disks having a generally flat bottom and upstanding abutments facing outwardly in opposite directions and lying on two lines defining the chords of two unobstructed segmental areas of substantially different sizes, said method including the steps of advancing a plurality of said disks in random angular positions edgewise along a supporting surface, applying a directive force to one or the other of the abutments on each disk during such advance to turn some of the disks into a first angular position and some of the disks into a second angular position, and, at predetermined point in the advance of the differently positioned disks, shifting those disks which are disposed in said first angular position transversely to remove such disks from the supporting surface and leave supported thereon only those disks which are in said second position.

6. A machine for advancing a row of circular disks in edge-to-edge relation along a predetermined path and delivering part of the disks to a point of use with such part of the disks disposed in a predetermined angular relation, each of said disks having a generally flat bottom and oppositely facing sets of abutments upstanding from the top of the disk to provide first and second vacant segments of substantially different widths, said machine having, in combination, an elongated upwardly facing track supporting a plurality of said disks for vibratory movement therealong in edge-to-edge relation, a member overlying one side portion of said track and spaced above the track a distance greater than the thickness of said disks and less than the height of said abutments, said member having a side edge extending along the track and overlying a central portion thereof, means urging each disk transversely of said track toward said one side portion to move one edge portion of each disk under said member and turn successive disks into one of two angular positions with either the larger segment or the smaller segment under said member depending upon which set of abutments moves against said side edge, and with the other segment of each disk projecting away from said side edge and across the exposed portion of said track, and a ledge along said path reducing the width of said exposed track portion whereby disks whose larger segments project away from said member fall off said track in passing said ledge and only those disks whose larger segments are beneath said member are retained on said track.

7. A machine as defined in claim 6 in which said urging means comprises a transverse incline on said track downwardly and toward said one side portion whereby said disks slide toward said one side portion and partially under said member in moving longitudinally along the track.

References Cited by the Examiner

UNITED STATES PATENTS 2,799,383    7/1957    Spurlin.
1,168,185    2/1965    Bader.

SAMUEL F. COLEMAN, *Primary Examiner.*

EDWARD A. SROKA, *Examiner.*